(12) United States Patent
Cooke et al.

(10) Patent No.: US 7,529,356 B2
(45) Date of Patent: May 5, 2009

(54) BILLING FOR TELECOMMUNICATION CALLS OVER DECENTRALIZED PACKET NETWORKS

(75) Inventors: Jawhny Cooke, San Jose, CA (US); Ted Huff, Felton, CA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 11/114,480

(22) Filed: Apr. 26, 2005

(65) Prior Publication Data
US 2006/0239427 A1   Oct. 26, 2006

(51) Int. Cl.
*H04M 15/00* (2006.01)
*H04L 12/28* (2006.01)
*H04L 12/56* (2006.01)

(52) U.S. Cl. .............. 379/126; 379/114.09; 379/115.01; 370/352; 370/401

(58) Field of Classification Search ................. 379/111, 379/112.01, 114.01, 114.03, 114.07, 114.09, 379/115.01, 115.03, 121.01, 124, 126; 370/352–356, 370/400–401, 404
See application file for complete search history.

(56) References Cited

U.S. PATENT DOCUMENTS

| | | | |
|---|---|---|---|
| 5,737,399 A * | 4/1998 | Witzman et al. ....... | 379/112.05 |
| 6,023,769 A | 2/2000 | Gonzalez | |
| 6,104,704 A * | 8/2000 | Buhler et al. ............... | 370/252 |
| 6,600,733 B2 * | 7/2003 | Deng .......................... | 370/352 |
| 6,718,023 B1 | 4/2004 | Zolotov | |
| 6,721,284 B1 | 4/2004 | Mottishaw et al. | |
| 6,775,519 B1 * | 8/2004 | Wiedeman et al. ......... | 455/12.1 |
| 6,854,014 B1 | 2/2005 | Amin et al. | |
| 7,420,978 B2 * | 9/2008 | Holloway et al. ........... | 370/401 |
| 2004/0210524 A1 | 10/2004 | Benenati et al. | |

OTHER PUBLICATIONS

Cisco Publication entitled Using RADIUS Authentication, Authorization and Accounting; obtained from www.cisco.com/univercd/cc/td/doc/product/aggr/bbsm/bbsm51/manager/radius.htm.
Mills, D.L., "RFC 958—Network Time Protocol (NTP)", Sep. 1985.

* cited by examiner

*Primary Examiner*—Binh K Tieu
(74) *Attorney, Agent, or Firm*—Charles J. Kulas; Trellis IP Law Group, PC

(57) ABSTRACT

A system for billing Internet protocol (IP) telephony, or other telecommunication calls transmitted over data packet networks, is provided. Calls may be routed over networks of different types, e.g., H.323 networks or IP voice networks. Different types of network devices, e.g., call managers, switches, or gateways, may transmit legs within a call. Each device type typically generates call records that have data fields unique to that device. In order to generate a single billing record for each call, call records are standardized and then matched with call records from other devices. Key fields within call records that may be matched include: call connect timestamps, signal start timestamps, calling party identifiers, called party identifiers, or network device identifiers. Timestamps within call records may be synchronized from a common time server.

16 Claims, 6 Drawing Sheets

BILLING FOR TELECOMMUNICATION CALLS OVER DECENTRALIZED PACKET NETWORKS

BACKGROUND OF THE INVENTION

Substantial changes have occurred in the telecommunication industry over approximately the past decade. These changes have been driven, in part, by the dominant technology that underlies long distance communication links transitioning away from time division multiplexing (TDM) to packet networks. Internet traffic, videoconference calls, and even everyday, audio phone calls are often conveyed as streams of digital information broken into small packets of fixed size. Each packet contains information on the destination network device to which the packet is to be sent. The packets travel over communication links within packet networks interspersed in no particular order with packets from other independent calls or sessions.

Today, packet networks often convey telecommunication calls, including every day, two party voice calls, audio conferences, and videoconference sessions. Such calls may pass though a number of network devices as they travel between the end nodes of the call, that is, between the telephones, videoconference stations, or voicemail systems involved in the call.

Packet networks may have decentralized architectures that provide multiple communication links from any particular end node to any other end node. Decentralization and redundant links within packet network is generally desirable in that it helps ensure the reliability of the telecommunication system if, for example, some of the network devices fail or cause loss or errors during transmission.

Telecommunication suppliers may allow customers to make an, unlimited number of calls within a specified service area for a fixed monthly access price. Nevertheless, per minute billing is still common, and even fixed monthly rate plans may charge by the minute for calls outside of the specified service area, for example, for calls to destinations outside the local calling area, or outside the United States.

When a telecommunication call is routed over packet networks among various network devices, there may be no single network device that has access to all of the details of the call that are relevant to billing for that call. This can be especially problematic where different network devices handling a call are manufactured or operated by different companies, or where different network devices use different communication protocols. Each type of network device may produce call data with different characteristics, for example, data in different data formats, data represented with different data types, or data using different data storage and handling schemes.

Call data is often recorded in the form of call records. Call records may be generated by various types of network devices, for example, switches or gateways. Call records may also be generated at various points during a call, for example, the beginning or the end of the call. Various details may be included in the various types of call records including time, date, call duration, number dialed, caller ID information, extension, line or trunk location, call completion status, etc. Call records can be used for usage verification, billing, network management, provisioning, and other purposes.

However, the type, format and handling of call records is typically different in network devices of different types. Thus, it is often difficult to process call records to properly determine the characteristics of a telecommunication call.

SUMMARY OF EMBODIMENTS OF THE INVENTION

Various embodiments of the invention provide systems and methods for processing call records. In a preferred embodiment, call records of different formats and record types are standardized to the same data format, and then matched to generate a billing record.

One embodiment of the invention provides: network devices that are configured to transmit a leg of a telecommunication call as a stream of packets and to generate a call record for each call transmitted by the device; at least one network configured to convey the packets between at least two network devices; and a billing server configured to receive the call records from at least two network devices and to generate a billing record from the call records. In some embodiments, the billing server generates the billing record by standardizing the call records to form standardized call records, and matching the standardized call records to each other.

Some embodiments of the invention include a time server. At least some of the network devices keep a current time value and set this value from the time server. This helps ensure that the various network devices within the telecommunication system generate call records with synchronized timestamps.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures.

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention.

On the other hand, details of specific embodiments of the invention are described, even though such details may not apply to other embodiments of the invention. For example, specific devices such as call managers, switches, and the like, are described herein as generating call data; nevertheless, any type of network device, processor, or other device or component can generate call data. As another example, specific call data record (CDR) formats are described herein; nevertheless, call records can include any data relevant to a call.

Some descriptions and discussions herein use abstract or general terms including but not limited to receive, present, prompt, generate, yes, or no. Those skilled in the art use such terms as a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 1:
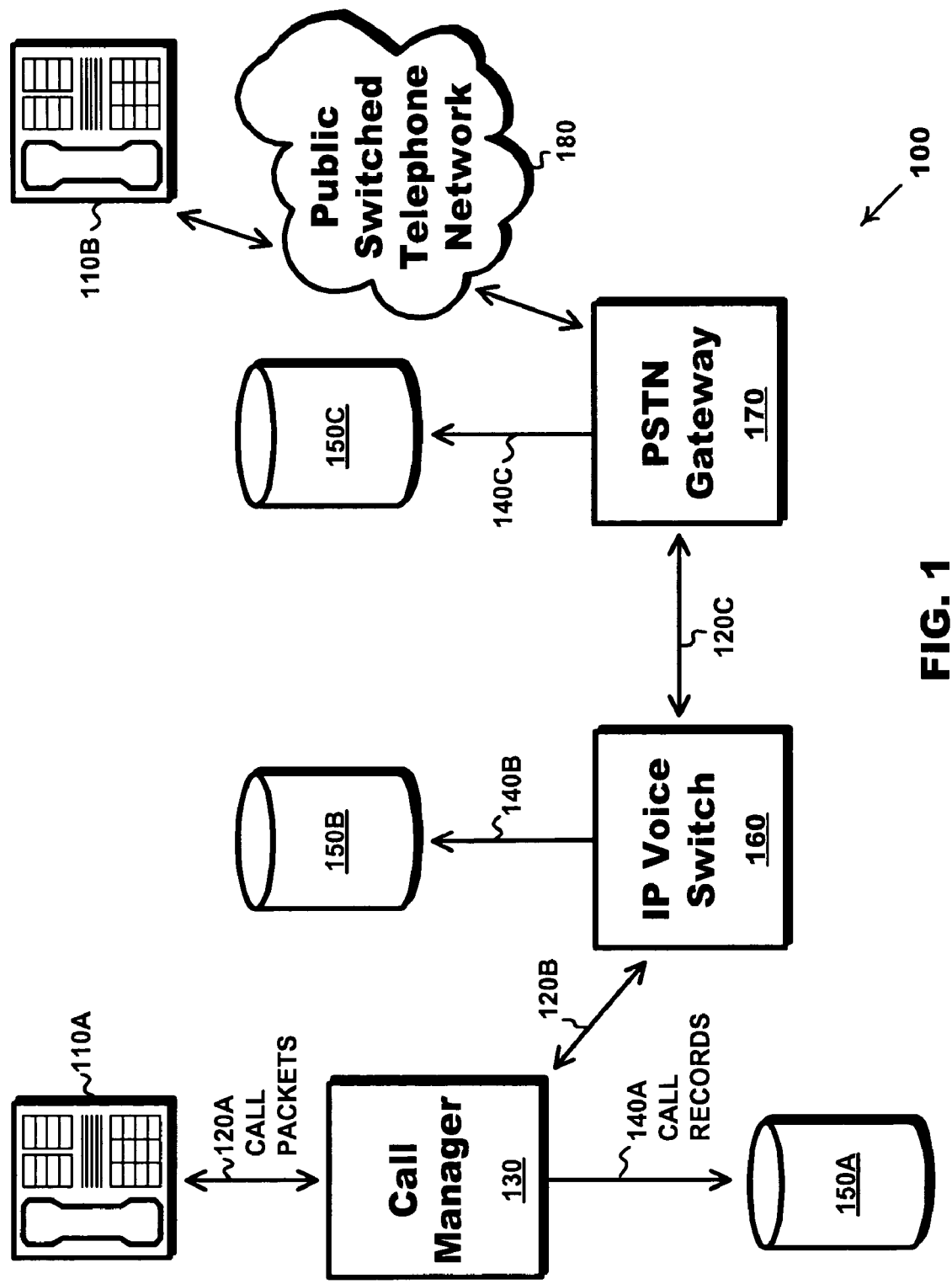
FIG. 1 shows the components and their interconnections within a telecommunication system according to an embodiment of the invention.

FIG. 1 is a block diagram of telecommunication system 100, which illustrates an embodiment of the invention. In system 100, telephone 110A is connected with call manager 130, which in turn is connected with IP voice switch 160. IP voice switch 160 is connected with PSTN gateway 170, which in turn is connected with the public switched telephone network (PSTN) 180. PSTN 180 is connected with telephone 110B.

A call between the two end nodes, that is, telephones 110A and 110B, passes through three network devices, that is, call manager 130, IP voice switch 160, and PSTN gateway 170. Call packets 120A convey such a call from telephone 110A to the call manager, then packets 120B convey the call from the call manager to the switch, and then call packets 120C convey the call from the switch to the gateway. The call is further conveyed though PSTN 180 from the gateway to telephone 110B.

Telephones 110 may be any devices that transmit, receive, or both transmit and receive audio signals, or any devices that place or answer telecommunication calls. Telephones 110 may include, but are not limited to one or more of: every day telephones; mobile phones; videoconference stations; or voicemail systems.

Each network device 130, 160, or 170 generates call records 140A, 140B, or 140C respectively. Call records 140 contain information about each call that passes through or is handled by the corresponding network device. This information is often intended for several purposes, for example: for system provisioning and administration; for monitoring the quality of service provided during the call; and for billing the appropriate user of telecommunication system 100 an appropriate charge for the call.

Network devices may write several call records pertaining to a single call at various points during a call. Such points in call include, but are not limited to one or more of: call initiation, call termination, or when the duration of a call exceeds a long call threshold.

Each network device 130, 160, or 170 writes the corresponding call record 140A, 140B, or 140C to the corresponding call record storage 150A, 150B, or 150C. Storages 150 may be hard disks internal to servers associated with the network devices, other storage media local to the corresponding network device, remote storage devices or storage media, or any mechanism for holding persistent data.

Call manager 130 may be any device that coveys telecommunication calls between telephones and a link in a packet network. Such packet networks may include, but are not limited to, voice over Internet protocol (VoIP) networks. Call manager 130 may be, but is not limited to, a network device running Cisco CallManager 4.0 or Cisco CallManager Express software. Such a network device may be, but is not limited to: a Cisco Media Convergence Server, e.g. one of the products in the MCS 7800 series; or a Cisco Integrated Communication System, e.g. one of the products in the ICS 7700 series.

In some embodiments of the invention, telephone 110A is an Internet protocol IP phone that uses the well known skinny client control protocol (SCCP) to communicate call packets 120A to call manager 130. Telephone 110A may be, but is not limited to, one of the products in the Cisco IP 7900 series.

IP voice switch 160 may be any device that switches, routes, or sets up telecommunications calls across packet network links. In some embodiments of the invention, IP voice switch 160 is softswitch that uses the well known H.323 protocol for conveying voice and video over IP as call packets 120B and 120C. IP voice switch 160 may be, but is not limited to, a Cisco model BTS 10200 Softswitch, or a Cisco model PGW 2200 Softswitch.

PSTN gateway 170 may be any device that coveys telecommunication calls between a packet network and PSTN 150 or a private switched network. In various embodiments of the invention, PSTN gateway 170 may be, but is not limited to: a Cisco IOS® interconnection operating system gateway; a signaling system 7 (SS7) gateway; a trunking gateway; or a Cisco MGX 8880 Media Gateway.

Figure 2:
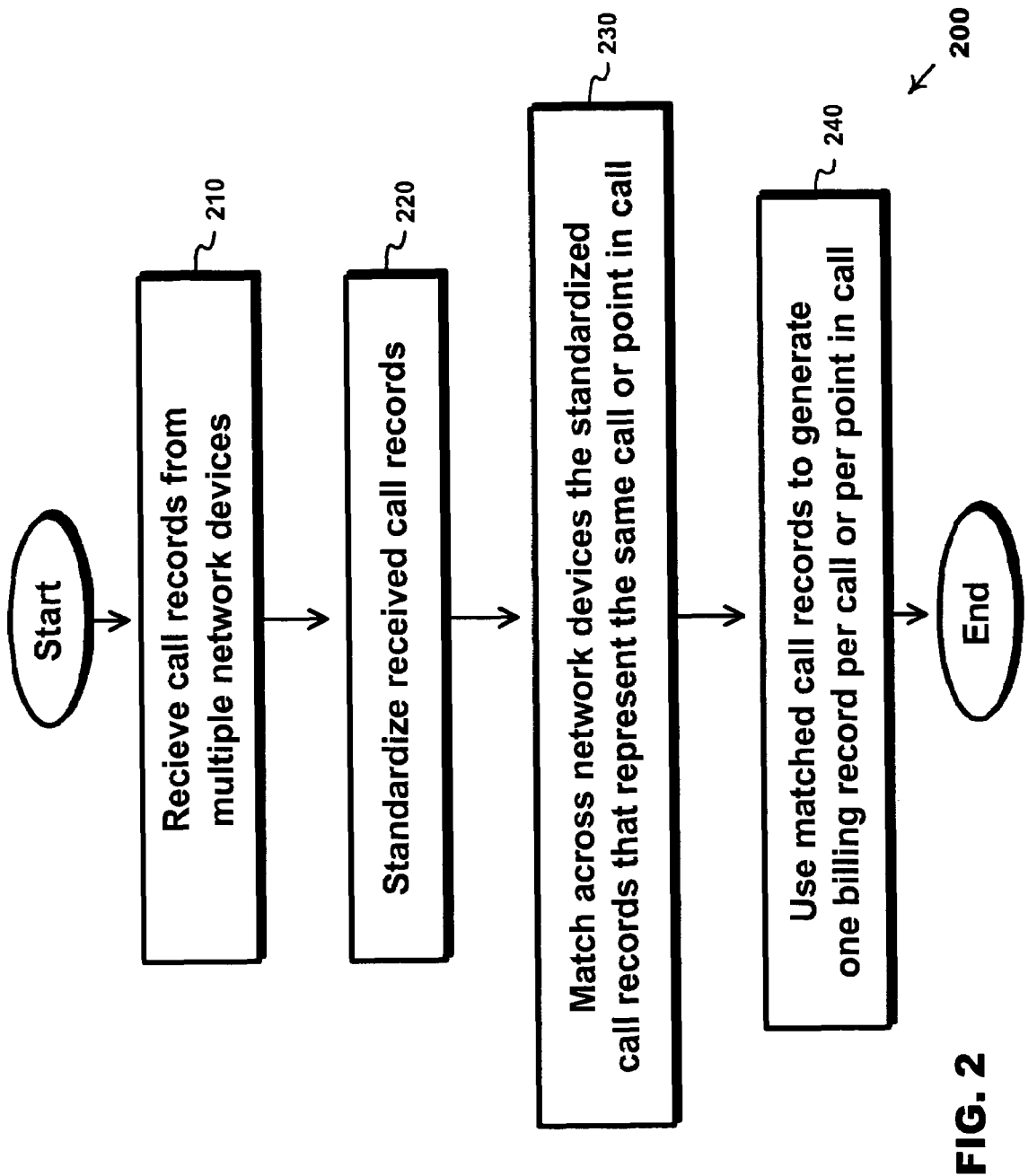
FIG. 2 shows the activities that occur during the process of generating a billing record according to another embodiment of the invention.

FIG. 2 is a flow chart of process 200 according to an embodiment of the invention. In process 200 a billing record for a telecommunication call is generated. Process 200 occurs in a billing server, such as billing server 420 described with reference to FIG. 4. In various embodiments of the invention, the billing server is one or more devices within a telecommunication system, including but not limited to one or more of: call manager 130; IP voice switch 160; PSTN gateway 170; another network device within the system; one or more servers associated with one or more of the network devices within the system; or one or more servers specialized for billing functions, or specialized for billing and system management functions.

Process 200 starts with activity 210 and ends with activity 240. In activity 210, the billing server receives the call records generated by two or more of the network devices within a telecommunication system. Activity 210 may be a relatively continuous process in which each network device sends individual call records to the billing server as they are generated, or sends a set of call records after a threshold number have been generated. Alternatively or additionally, activity 210 may be a periodic or batched event that occurs when scheduled, for example, every day at 2 AM. In activity 210, each network device sends to the billing server the call records it has generated since the last transfer of call records, and then either deletes these call records, or marks them as sent.

In activity 220, the received call records are normalized or standardized as to format and data type. This standardization activity solves the problem that arises because various types of network devices typically generate call records that have various structures, for example flat files versus entries in a relational data base. Further, the call records generated by various network devices may have different field names for the same or similar information, may represent the same information in various formats, or both.

As one example of this problem, IP addresses may be represented as integers with reversed bytes (as described with respect to Table 1), as unsigned values, or as dotted decimal strings, that is, strings of decimal characters interspersed with decimal points.

As another example, a first network device may represent a time stamp as a text string containing a human readable date and time, "Dec. 6, 1997 18:11:53", for example. However, a second device may use an integer representing only the time of day as universal coordinated time (UTC) seconds, while a third device may represent both date and time as epoch time seconds in a 32 bit unsigned data field. UTC was formerly known as Greenwich mean time. UTC seconds are the number of seconds since the most recent occurrence of 00:00:00 on the Greenwich, 0 degree meridian. Epoch time represents a date and time as the number of seconds since 00:00:00 UTC on Jan. 1, 1970.

Sometimes different types of network devices share a common operating system or common application software. For example, many router network devices manufactured by Cisco Systems, Inc. run the Cisco IOS operating system. Network devices using IOS typically generate call records in the format specified by the well known remote authentication dial in user service (RADIUS) network protocol. In some embodiments of the invention, the standardized call records produced by activity 210 are RADIUS call records, or call records formatted as closely as possible to RADIUS call records.

In activity 230, the standardized call records are correlated or matched together from each network device involved in each telecommunication call. In some embodiments of the invention, the result of this matching process is one set of matched call records for each call. In other embodiments, the result is one record for each significant point in each call, that is, each point in call (PIC) that generated a call data record (CDR).

Various embodiments of the invention differ as to how matching occurs within activity 230. For example, not all of the fields within a call record need to match to adequately correlate the call records. That is, different embodiments require that different sets of data fields within the call records match, while ignoring, for matching purposes, other fields within the call records.

As another example, some embodiments of the invention rely on the accuracy of the current time value used by each network device, or at least rely on the devices' current time values being closely synchronized. In such embodiments, timestamps from various devices can be matched simply by testing for timestamps with equal numeric values. In contrast, other embodiments consider timestamps to match if the difference between them is less than a tolerance value, or apply an offset to the timestamps generated by a particular network device, or use both tolerances and offsets. Timestamp offsets may be used to compensate for the current time value drifting on a network device, or network devices that are set to different time zones Activity 230 is not limited to the examples given herein and may include one or more of various matching schemes and criteria. Such schemes and criteria include, but are not limited to one or more of, those known in the art as expert system techniques, voting techniques, or fuzzy logic techniques.

Some embodiments of the invention use call records from one particular network device as parent records within activity 230. For example, call records 140B generated by IP voice switch 160, described in reference to FIG. 1, may be deemed the most reliable call records and thus used as the parent call records. In such embodiments, each parent call record provides the core set of data to which the child records are correlated. For each particular parent call record, the call records from devices are searched for any matching call records. Then, the data fields to be written into the corresponding billing record are gathered both from that particular parent call record, as well as from any call records from any other devices that match that parent call record.

In activity 240, the matched call records corresponding to a particular call are combined to generate a billing record for that call. Alternatively or additionally, the matched call records corresponding to a particular point in call for a particular call are combined to generate a billing record for that point in call. Various embodiments of the invention include in the billing record various fields from the call records, and exclude other fields from the call records.

Figure 3:
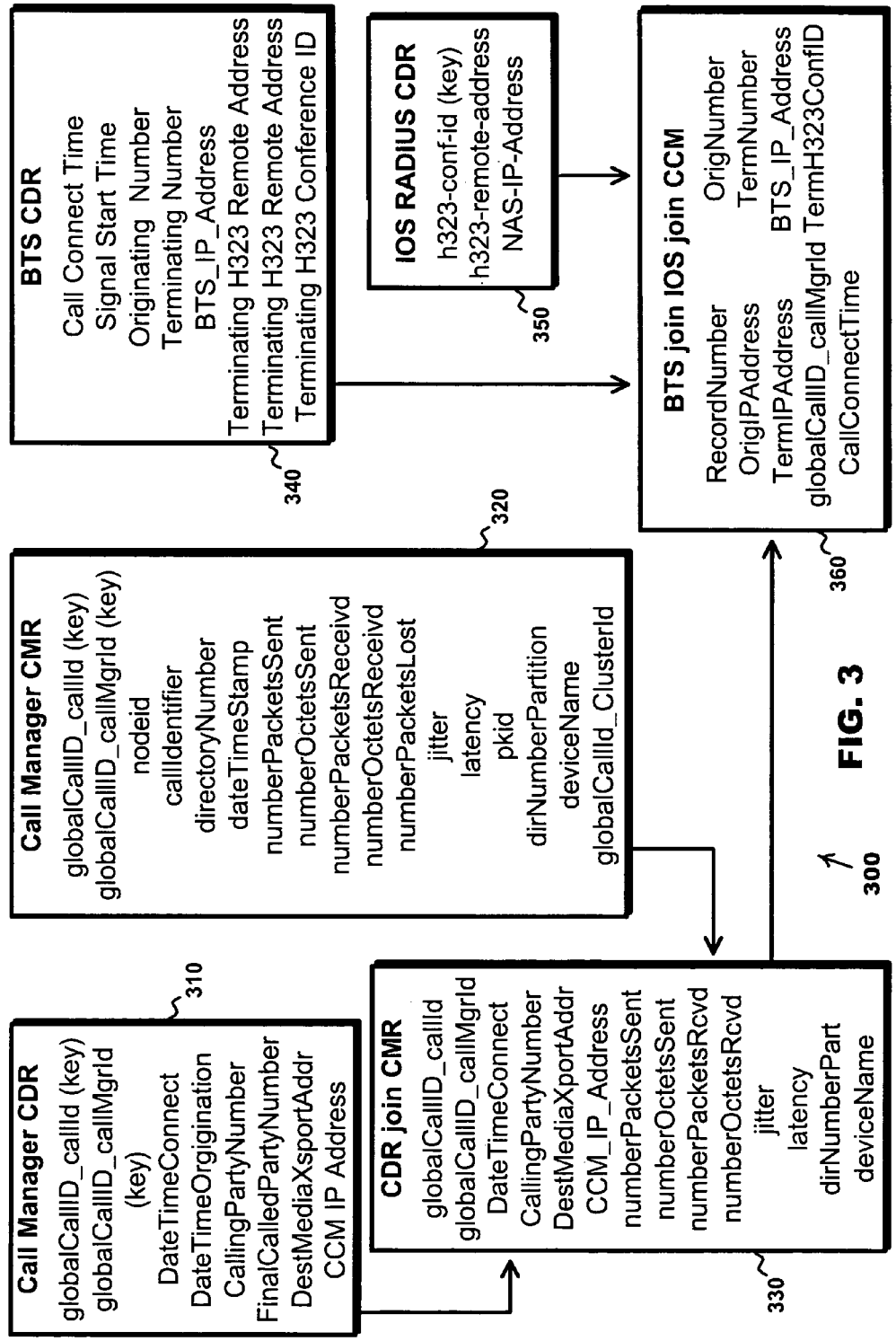
FIG. 3 shows the data fields within the call records used in yet another embodiment of the invention, as well as the matching process that occurs among these call records.

FIG. 3 is a data structure diagram, according to an embodiment of the invention, of the call records and of the billing record generated from these call records. FIG. 3 also illustrates the data flow that occurs in process 300, which corresponds to activities 230 and 240 described in reference to FIG. 2.

Process 300 starts with call manager call records 310 and 320, IP voice switch call record 340, and PSTN gateway call record 350. The matching process, described with respect to activity 230, selects the records used in each occurrence of process 300. The result of each occurrence of process 300 is a billing record 360, which is the billing record that corresponds to the call records that are matched with each other.

Call manager 130 generates call manager call records 310 and 320, which are also known as, respectively, the call data record (CDR) and the call management record (CMR). Call records 310 and 320 correspond to call records 140A. IP voice switch 160 generates IP voice switch call record 340, which is also known as the BTS CDR and which corresponds to call record 140B. PSTN gateway 170 generates call record 350, which is also known as the IOS RADIUS CDR and which corresponds to call record 140C. Call manager 130, call records 140, IP voice switch 160, and PSTN gateway 170 and are described in reference to FIG. 1.

Within process 300, call manager call records 310 and 320 are joined to form intermediate record 330, also known as CDR join CMR. Typically, but not necessarily, this join activity occurs in call manager 130. Then within process 300, a three way join occurs among intermediate record 330, IP voice switch call record 340, and PSTN gateway call record 350 to form billing record 360. Billing record 360 is also known as BTS join IOS join CCM.

Table 1 describes some of the data fields within call manager call records 310 and 320 and intermediate record 330.

TABLE 1

Selected Fields within the Call Manager Call Records

| Fields within Records 310, 320 and 330 | Format and Data Type | Description |
| --- | --- | --- |
| dateTime-Connect | Zero, or universal coordinated time (UTC) represented as an integer | The date and time when the call connected. If the call was not answered, then zero. |
| dateTime-Origination | UTC represented as an integer | The date and time when the user goes off hook, or the date and time when the setup message is received for an incoming call. |
| callingParty-Number | String of up to 25 digits | For calls that originate at an IP phone, the extension number of the line that is used. For incoming calls, the value received in the calling party number field in the setup message. This field |

TABLE 1-continued

Selected Fields within the Call Manager Call Records

| Fields within Records 310, 320 and 330 | Format and Data Type | Description |
|---|---|---|
| finalCalled-PartyNumber | String of up to 25 characters | reflects any translations that were applied to the calling party number before it arrives at the call manager (e.g. translations at the gateway). The number to which the call is finally presented, until it is answered or rings out. If no forwarding occurred, this number shows the same number as the OriginalCalledPartyNumber. For calls to a conference bridge, this field contains the actual identifier of the conference bridge, which is an alphanumeric string (e.g., "b0019901001"). |
| destMedia-Transport-Address_IP | IP address with bytes reversed represented as an integer | The IP address of the device that terminated the media for the call. For IP phones, the address of the IP phone. For PSTN calls, the address of the H.323 gateway. For inter-cluster calls, the address of the remote IP phone. |
| origMedia-Transport-Address_IP | IP address with bytes reversed represented as an integer | The IP address of the device that originated the media for the call. For IP phones, the address of the IP phone. For PSTN calls, the address of the gateway. For inter-cluster calls, the address of the remote IP phone. |

Some fields within records 310, 320, or 330 represent IP addresses as signed integers with the order of the bytes reversed. To convert such a signed integer IP address into the well known dotted decimal representation, first convert the signed integer (−1139627840, for example) into hexadecimal (giving 0xBC12A8C0, for example), then reverse the order among the bytes (giving 0x C0 A8 12 BC, for example), and then convert each byte to decimal and intersperse the decimal points (resulting in 192.168.18.188, for example).

Table 2 describes some of the data fields within IP voice switch call record 340.

TABLE 2

Selected Fields within IP Voice Switch Call Record 340

| Fields within IP Voice Switch Call Record | Format and Data Type | Description |
|---|---|---|
| Call Connect Time | Epoch time seconds as a 32 bit unsigned value. | Time starts on receipt of NCS NTFY indicating off-hook, SS7 ANS, or answer indication from the media gateway for an operator services trunk. |
| Signal Start Time | Epoch time seconds as a 32 bit unsigned value. | Time starts on receipt of an NCS NTFY or SS7 IAM. |
| Originating Number | String of digits | Directory number of the originating party. If this field is NULL, then no data was captured for this record. |

TABLE 2-continued

Selected Fields within IP Voice Switch Call Record 340

| Fields within IP Voice Switch Call Record | Format and Data Type | Description |
|---|---|---|
| Terminating Number | String of digits | Directory number of the terminating party. If this field is NULL, then no data was captured for this record. |
| Originating H323 Remote Address | String of digits in dotted decimal format | IP address of originating remote gateway. Only calls over an H.323 network capture this data. This field is NULL when no data is captured. |

Table 3 describes some of the data fields within PSTN gateway call record 350. Table 3 also applies to call records that are generated by other types of software or other network devices that operate with the Cisco IOS operating system. Such devices and software include, but are not limited to, CallManager Express.

TABLE 3

Selected Fields within PSTN Gateway Call Record 350

| Fields within PSTN Gateway Call Record | Format and Data Type | Description |
|---|---|---|
| h323-conf-id | 16-byte value as a hexadecimal string, with a space between each 4 bytes of the value. | A unique call identifier generated by the gateway to identify the separate calls within a single calling session. In the call control application programming interface (CCAPI) within IOS, this value is called the globally unique identifier (GUID). The h323-conf-id is different from the h323-incoming-conf-id. |
| h323-remote-address | String of digits in dotted decimal format | IP address of the remote switch |
| NAS-IP-address | String of digits in dotted decimal format | The RADIUS NAS-IP-Address. The Attribute Configurability feature allows an arbitrary IP address to be used as RADIUS attribute 4, i.e., the NAS-IP-Address, without changing the source IP address in the IP header of the RADIUS packets. |

Table 4 describes the matching activity within process 300, that is, it describes which fields within which call records are matched with which fields in other call records. As Table 4 shows, the call records generated by various network devices use different field names for essentially the same information.

TABLE 4

Fields To Be Matched Across the Call Records
from Different Network Devices

| Call Manager Call Record 330 | IP Voice Switch Call Record 340 | PSTN Gateway Call Record 350 |
|---|---|---|
| dateTimeConnect | Call Connect Time | |
| dateTimeOrigination | Signal Start Time | |
| callingPartyNumber | Originating Number | |
| finalCalledPartyNumber | Terminating Number | |
| IP address of the call manager that created this call manager call record | Originating H323 Remote Address | |
| | Terminating H323 Remote Address | Gateway IP Address (RADIUS NAS-IP-Address) |
| | Terminating H323 Conference Id | RADIUS h323-conf-id |
| | IP address of the switch that created this switch call record | h323-remote-address |

Billing record 360 contains a field corresponding to each row of Table 4. Billing record 360 also contains a Record-Number field, which is set to a unique, sequential number when each billing record is generated.

Figure 4:
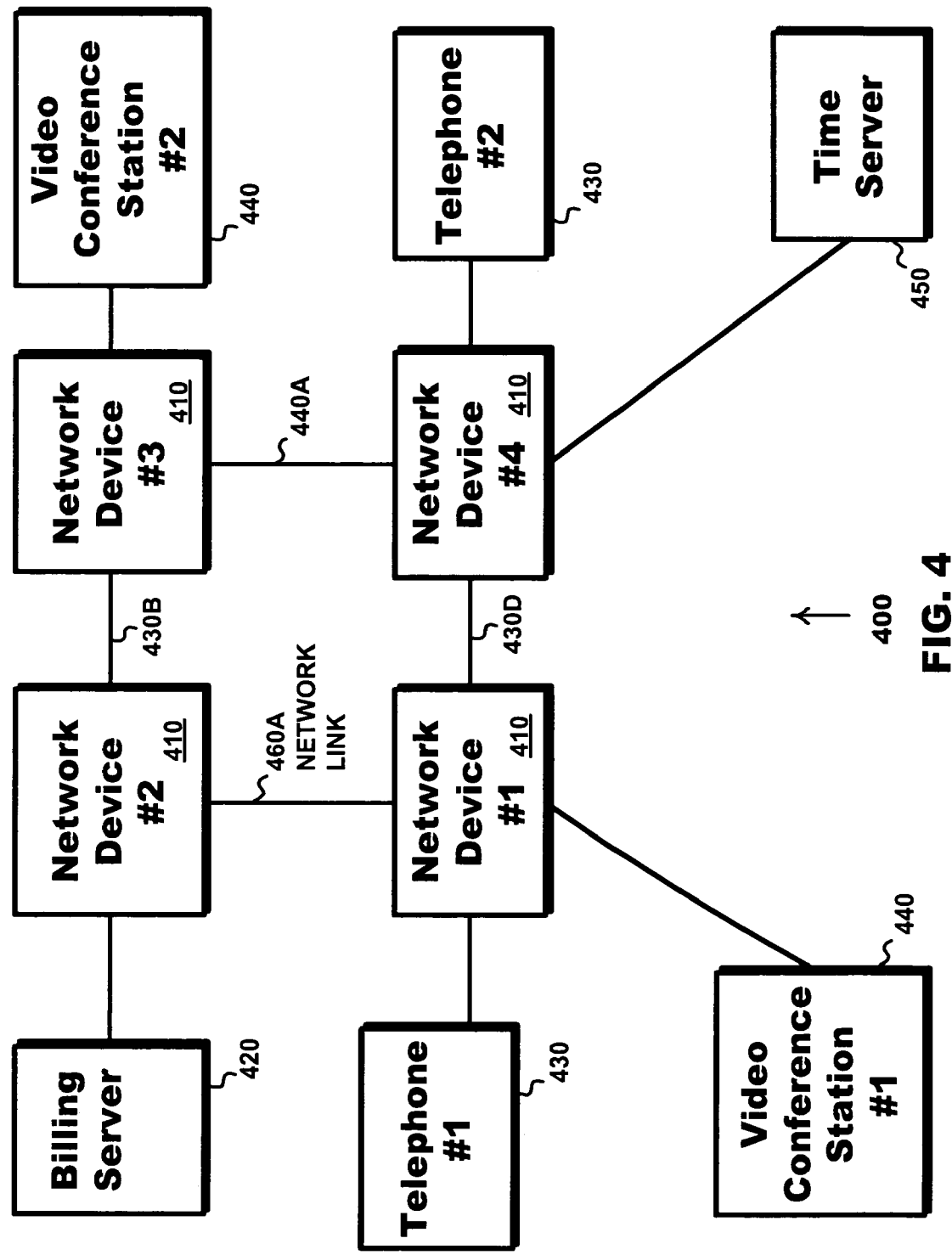
FIG. 4 shows the components and their interconnections within another telecommunication system according to an embodiment of the invention.

FIG. 4 is a block diagram of telecommunication system 400, which illustrates an embodiment of the invention. In system 400, billing server 420, time server 450, each telephone 430, and each videoconference station 440 has a communication link with one of the four network devices 410. Network devices 410 are linked together by network links 440A to 460D. Some pairs of the network devices are linked directly by a single network link, for example, network devices #1 and #2 are linked by network link 460A, while other pairs rely on a intermediate network device to switch or route communications between them.

System 400, conveys telecommunication calls among two or more of the end stations, that is, telephones 430 or videoconference stations 440. Each call may be an audio call or an audio/video call, each may be a two-way call between two end stations, a multi-way call among three or more end stations, or a one-way broadcast from one or more end stations to one or more end stations.

Telephones 430 are similar in form and function to telephones 110, which are described with reference to FIG. 1. Videoconference stations 440 may be any device that allows users to place or receive telecommunication calls. Typically, but not necessarily, stations 440 allow for both the transmission and reception of both audio and video signals.

Most calls are conveyed as streams of digital packets over one or more of network links 460 between two or more of network devices 410. However, some calls may only involve a single network device. For example, a call between telephone 430 #1 and video conference station 440 #1 involves only network device 410 #1 because both end nodes have direct links to this network device.

Network devices 410 are similar in form and function to call manager 130, switch 160, or PSTN gateway 170, which are described with reference to FIG. 1. Devices 410 may be any device that receives or transmits a leg of a telecommunication call as a stream of digital packets. Such devices include but are not limited to one or more of: call managers; switches; soft switches; multi-service switches; IP voice switches; gateways; media gateways; PSTN gateways; bridges; or routers.

Network links 460 between devices 410 may be, but are not limited to: Internet protocol (IP) networks; asynchronous transfer mode (ATM) networks; frame relay networks; time division multiplexing (TDM) links; the public switched phone network (PSTN); or combinations thereof.

Billing server 420 performs the process of generating a billing record for each call handled by system 400. This process may include, but is not limited to one or more of, processes 200 or 300 described in reference to FIGS. 2 or 3. Different call routes may result in calls passing through different numbers of billing points, that is, network devices that generate a call record. Thus, this process may include matching call records from various numbers of network devices.

Time server 450 provides a time reference that is uniform across network devices 410. One or more of devices 410 set the current time value held by that device by asking for, and receiving a current time value from time server 450. Some embodiments of the invention do this by means of the well known network time protocol (NTP). NTP is supported, for example, under the Solaris® operating system from Sun Microsystems. Devices 410 may set their time value whenever rebooted, or on a regular periodic schedule (e.g. once a day), or both. In some embodiments of the invention, one of the network devices also functions as the time server for the telecommunication network. This device may, but need not, be IP voice switch 160 described in reference to FIG. 1.

In some embodiments of the invention, some or all of the network devices used may not have synchronized time values. In such embodiments, the matching process described with respect to FIG. 2 above may take into account possible discrepancies among the timestamps in the call records generated by devices with differing time values.

Figure 5:
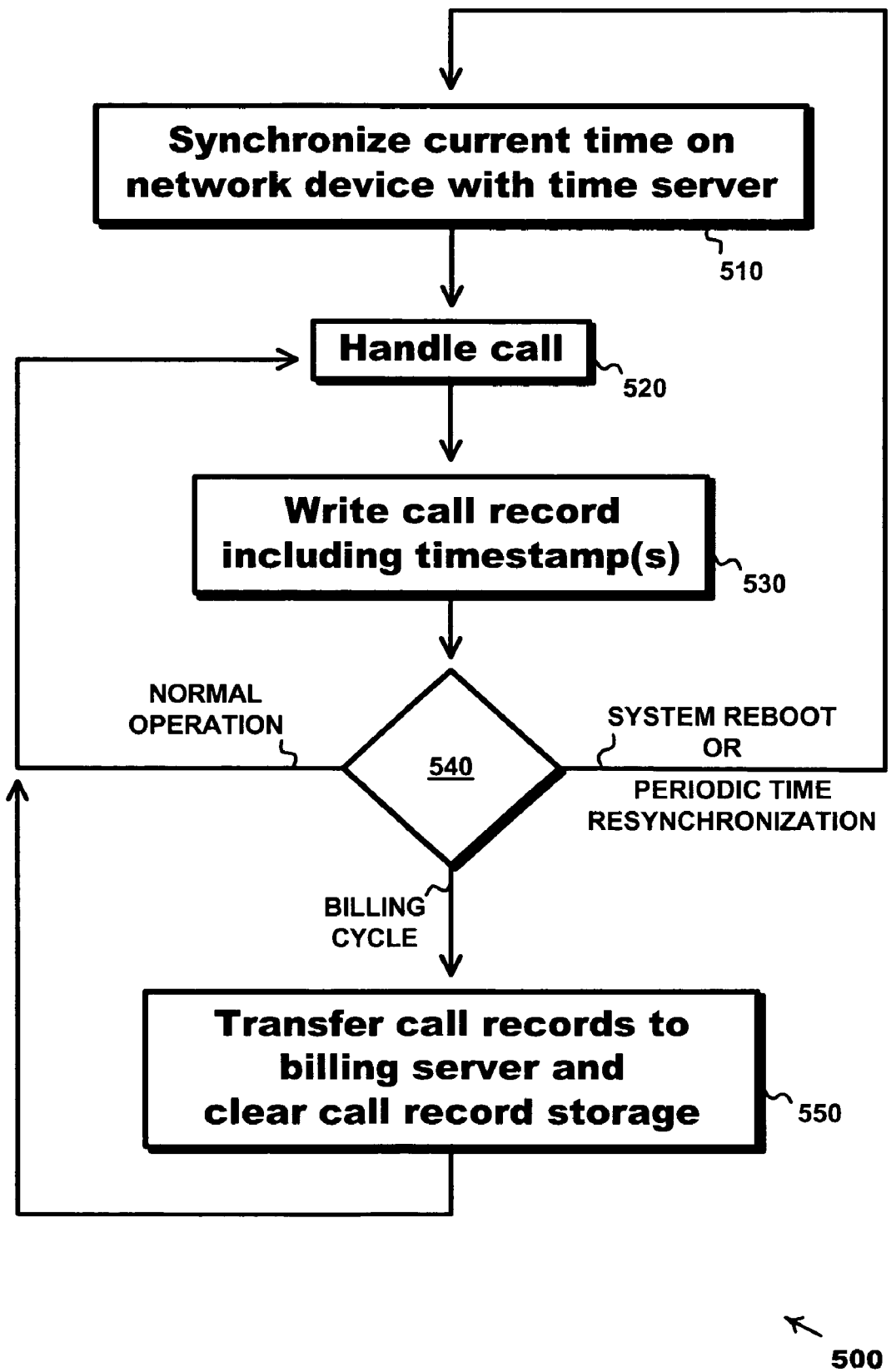
FIG. 5 shows the activities that occur during the operation of a network device within a telecommunication system according to another embodiment of the invention.

FIG. 5 is a flow chart of process 500, which describes the operation of a network device according to an embodiment of the invention. Process 500 is ongoing and has no predefined end points.

Activity 510 occurs whenever the network device boots, reboots, or undergoes a periodic time resynchronization. In activity 510, the value for the current time that is held within the network device is synchronized with a current time value from a time server. Activity 510 may use the NTP protocol described in reference to time server 450 of FIG. 4.

After activity 510, activities 520 and 530 occur repeatedly. In activity 520, the network device handles a telecommunication call in which it is involved. Typically, but not necessarily, the network device receives a first leg of the call from a first network link and retransmits the voice (or videoconference) information received over a second network link as a second leg of the call. In activity 530, the network device writes a call record containing information about the call.

Activities 520 and 530 may occur at different times within the same call. For example, either or both activities may occur when a call is initially set up, when it is terminated, when its duration exceeds a long call threshold, or when a user initiates a call transfer or three way call during a call. Activities 520 and 530 may be performed by different circuitry or software within the network device, and these activities may occur concurrently.

Decision block 540 alters the normal operation of the network device in which activities 520 and 530 repeat. Occasionally, decision block 540 repeats activity 510, that is, time synchronization. This may occur on a regular schedule, on a command from an administrator of the telecommunications system, or after the network device boots or reboots. Occasionally decision block 540 causes activity 550 to occur. In activity 550, the call records generated in activity 530 are transferred to a billing server and the storage that was holding these call records is cleared or these records are marked as sent.

Some lower-capacity devices, such as call managers, are not always able to resolve billing records when the records come in at a high rate from higher-capacity devices (e.g., a gateway). For example, if a call manager that has a processing limit on records of 20 per second receives a higher rate of records then some of the records will not normally be resolvable by the call manager. This type of problem can occur when there is a three-point record situation where a gateway is providing records at high speed to two different call managers. One embodiment of the invention provides for sub-second (e.g., more than 20 per second) record resolving at a call manager by first filtering and matching records according to a gross time (e.g., within one secone) and then making a secondary match (or database query) based on one or more data fields in the records.

Figure 6:
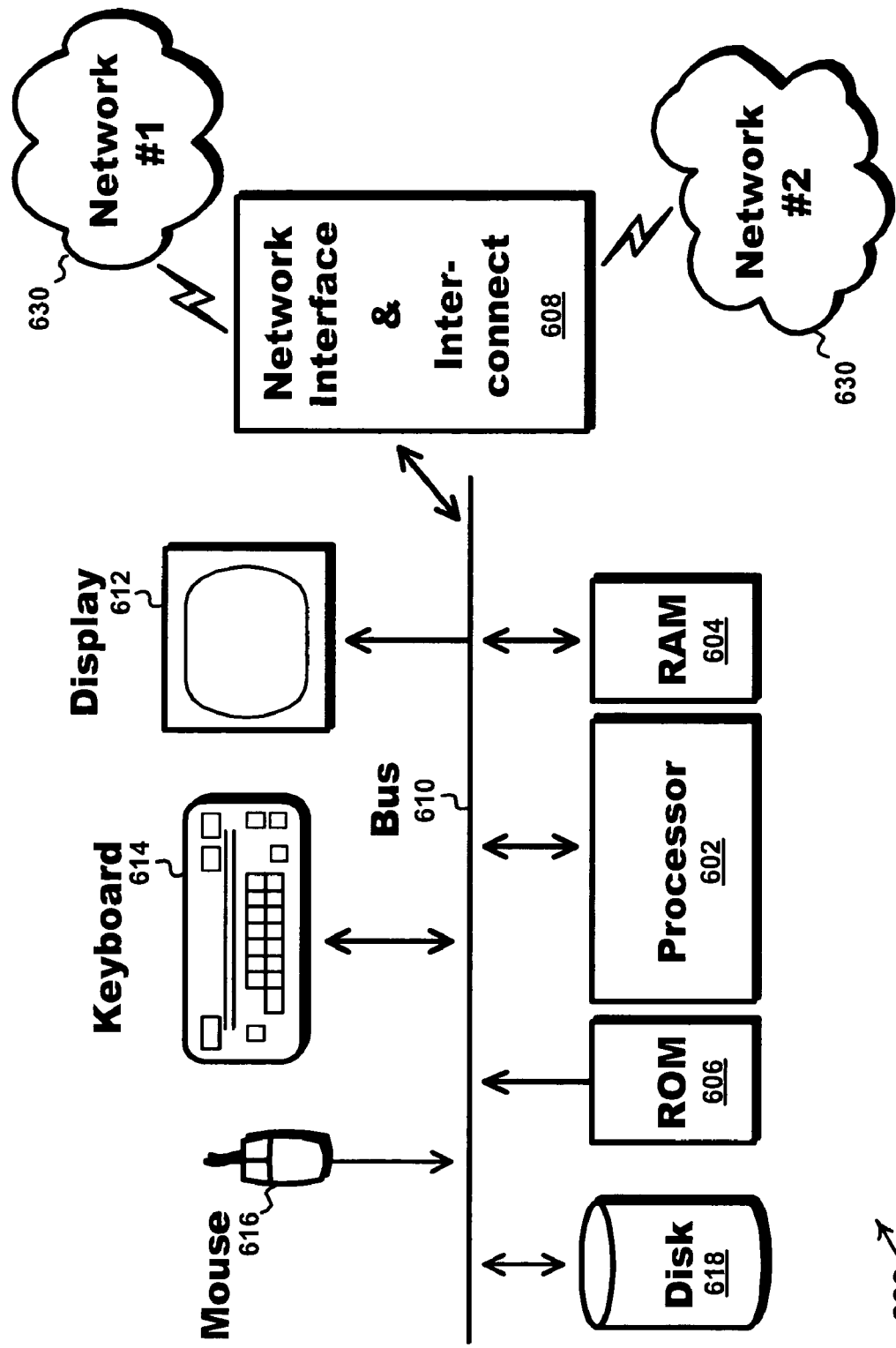
FIG. 6 shows the components and their interconnections within a network device, server, or the like, that may be used in various embodiments of the invention.

FIG. 6 is a block diagram of a computer system 600, for example, a network device, a server, or the like. Various embodiments of the invention may use system 600, and variants thereon, in various ways.

Such uses include, but are not limited to, being used as one or more of: servers; network devices; workstations; personal computers; call manager 130; IP voice switch 160; PSTN gateway 170; network device 410; billing server 420; telephone 430; videoconference station 440; time server 450; or as devices that interface with, control, or manage various aspects of various embodiments of the invention. Call manager 130, IP voice switch 160, and PSTN gateway 170 are described in reference to FIG. 1. Network device 410, billing server 420, telephone 430, videoconference station 440, and time server 450 are described in reference to FIG. 4.

Computer system 600 includes one or more buses 610 configured to communicate information, such as addresses, operation codes, or data. The computer system also comprises one or more processors 602 configured to process information and data according to instructions and other data. The processor may be, but is not limited to: a central processing unit; a microprocessor; an embedded processor; or a special purpose processor.

Computer system 600 may optionally include RAM 604, that is, one or more volatile memory units, devices or circuits configured to store information, data or instructions. RAM 604 may be but is not limited to random access memory (RAM), static RAM, or dynamic RAM. RAM 604 is coupled to bus 610.

Computer system 600 may optionally include ROM 606, that is, one or more non-volatile memory units or other devices or circuits configured to store static information and instructions. ROM 606 may include, but is not limited to one or more of: read only memory (ROM); programmable ROM; flash memory; electrically programmable ROM (EPROM); or erasable electrically programmable ROM (EEPROM). ROM 606 is coupled with bus 610.

Computer system 600 may optionally include network interface and interconnect 608, that is, one or more devices or circuits configured to interface with one or more other electronic devices via one or more networks 630. Network interface and interconnect 608 is coupled to bus 610. Network interface and interconnect 608 may optionally perform one or more of: switching, routing, bridging, or relay functions among networks 630. Networks 630 may include, but are not limited to one or more of: Internet protocol (IP) networks; asynchronous transfer mode (ATM) networks; frame relay networks; time division multiplexing (TDM) networks; or the public switched telephone network (PSTN).

Computer system 600 may optionally include keyboard 614, that is, one or more alphanumeric input devices configured to communicate information and command selections from a user. Keyboard 614 may, for example, have alphabetic, numeric, function and control keys, buttons, selectors or touch-sensitive screens. The keyboard is coupled to bus 610. Alternatively or additionally, the functions of keyboard 614 may be directed or activated via input from mouse 616 using special menus, click sequences, or commands.

Computer system 600 may optionally include mouse 616, that is, one or more cursor control, indicating, selecting, pointing, or control devices configured to communicate analog, quantitative or selection user input information and command selections to processor 602. Mouse 616 may include, but is not limited to one or more of: a mouse; a track ball; a touch pad; an optical tracking device; a joystick; a game controller; a touch screen; or a glove. The mouse is coupled to bus 610. Alternatively or additionally, the functions of mouse 616 may be directed or activated via input from keyboard 614 using special keys, key sequences or commands.

Computer system 600 may optionally include disk 618, that is, one or more devices or circuits configured to store information, data or instructions. Disk 618 may include, but is not limited to one or more of: a mass storage device; a magnetic disk; an optical disk; a compact disk (CD); a writeable CD; a digital versatile disk (DVD); a hard disk; a floppy disk; a flash memory; or a memory stick. Disk 618 is coupled to bus 610.

Computer system 600 may optionally include display 612, that is, one or more devices or circuits configured to display pictures, video, text, or graphics. Display 612 may include, but is not limited to one or more of: a cathode ray tube (CRT); a flat panel display; a liquid crystal display (LCD); a field emission display (FED); or a heads up display suitable for use in a vehicle. Display 612 is coupled to bus 610.

Although the invention has been described with respect to specific embodiments thereof, these embodiments are merely illustrative, and not restrictive of the invention. For example, systems 100, 400, and 600, as shown in FIGS. 1, 4, and 6 are only illustrative. The invention may be embodied in telecommunication systems and devices with more or fewer components, other types of components, or other interconnection schemes.

Further, processes 200, 300, and 500 are only illustrative examples. The invention may be embodied in telecommunication processes with more or fewer activities, other types of activities, and other control flows or concurrencies among the activities. Further, the data structures, call records, billing records, and matching criteria described in regard to FIG. 3 and Tables 1 to 5 are only illustrative examples. The invention may be embodied in methods or systems that use other data structures or matching criteria.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain or store the program for use by or in connection with the instruction execution system, apparatus, system or device. The computer readable medium can be, by way of example only but not by limitation, an electronic, magnetic, optical, electromagnetic, or semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A telecommunication system for providing a billing record for a call transmitted as packets over at least a portion of the call, the telecommunication system comprising:
   network devices, each configured to transmit a leg of the call as a stream of packets and to generate a call record for each call transmitted by the device;
   at least one network configured to convey the packets between at least two network devices;
   a time server, wherein at least one of the network devices is further configured to hold a current time value, to set the current time value from the time server, and to generate call records that include a timestamp data field that is set to the current time value; and
   a billing server configured to receive the call records from at least two network devices and to generate from the call records a billing record by filtering the call records based on a time value from the time server and then matching two or more fields in the call records.

2. The telecommunication system of claim 1, where the call is selected from a voice call or a videoconference call.

3. The telecommunication system of claim 1, where the packets are selected from one or more of Internet protocol (IP) packets, asynchronous transfer mode (ATM) packets, or frame relay packets.

4. The telecommunication system of claim 1, where the network devices are selected from one or more of a call manager, a switch, a soft switch, a multi-service switch, an IP voice switch, a gateway, a media gateway, a PSTN gateway, a bridge, or a router.

5. The telecommunication system of claim 1, where the billing server is further configured to generate the billing record by standardizing the call records to form standardized call records, and matching the standardized call records to each other.

6. The telecommunication system of claim 1, where the billing server is further configured to match the call records by selecting standardized call records that are generated by a first network device and that contain at least one data field matching a data field within a particular call record generated by a second network device.

7. The telecommunication system of claim 6, where the billing server is further configured to match data fields selected from one or more of a call connect timestamp, a signal start timestamp, an calling party identifier, a called party identifier, or a network device identifier.

8. A method of generating a billing record for a telecommunication call transmitted as packets, the method comprising
  receiving call records from a plurality of network devices;
  using a time server to match call records, wherein at least one of the network devices is further configured to hold a current time value, to set the current time value from the time server, and to generate call records that include a timestamp data field that is set to the current time value;
  filtering the call records based on a time value from the time server and then matching two or more fields in the call records to create matched call records; and
  generating a billing record from the call records by using the matched call records.

9. The method of claim 8, where the telecommunication call is selected from a voice call or a videoconference call.

10. The method of claim 8, where the packets are selected from one or more of Internet protocol (IP) packets, asynchronous transfer mode (ATM) packets, or frame relay packets.

11. The method of claim 8, wherein generating a billing record further includes standardizing the call records to form standardized call records, and matching the standardized call records to each other.

12. The method of claim 8, further comprising:
  holding a current time value; and
  setting the current time value from a time server;
  where the generating of the call records further includes setting a timestamp data field within the call record to the current time value.

13. The method of claim 8, further comprising:
  matching call records by selecting standardized call records that are generated by a first network device and that contain at least one data field matching a data field within a particular call record generated by a second network device.

14. The method of claim 13, wherein matching call records includes
  matching data fields selected from one or more of a call connect timestamp, a signal start timestamp, an calling party identifier, a called party identifier, or a network device identifier.

15. An apparatus for generating a billing record for a telecommunication call transmitted as packets, the apparatus comprising:
  a processor;
  a machine-readable media including instructions executable by the processor for receiving call records from a plurality of network devices;
  using a time server to match call records, wherein at least one of the network devices is further configured to hold a current time value, to set the current time value from the time server, and to generate call records that include a timestamp data field that is set to the current time value;
  filtering the call records based on a time value from the time server and then matching two or more fields in the call records to create matched call records; and
  generating a billing record from the call records by using the matched call records.

16. A computer readable storage device including instructions executable by a processor for generating a billing record for a telecommunication call transmitted as packets, the machine-readable medium comprising:
  one or more instructions for receiving call records from a plurality of network devices;
  one or more instructions for using a time server to match call records, wherein at least one of the network devices is further configured to hold a current time value, to set the current time value from the time server, and to generate call records that include a timestamp data field that is set to the current time value;
  one or more instructions for filtering the call records based on a time value from the time server and then matching two or more fields in the call records to create matched call records; and
  one or more instructions for generating a billing record from the call records by using the matched call records.

* * * * *